(12) United States Patent
Hirano

(10) Patent No.: US 12,183,366 B2
(45) Date of Patent: Dec. 31, 2024

(54) REMOVABLE DISK CLAMP FOR READ-WRITE DEVICE IN ARCHIVAL DATA STORAGE LIBRARY

(71) Applicant: Western Digital Technologies, Inc., San Jose, CA (US)

(72) Inventor: Toshiki Hirano, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 18/222,840

(22) Filed: Jul. 17, 2023

(65) Prior Publication Data

US 2023/0360675 A1 Nov. 9, 2023

Related U.S. Application Data

(62) Division of application No. 17/465,848, filed on Sep. 3, 2021, now Pat. No. 11,756,583.

(51) Int. Cl.
G11B 17/028 (2006.01)
G11B 19/20 (2006.01)
(Continued)

(52) U.S. Cl.
CPC ........ *G11B 17/028* (2013.01); *G11B 17/0282* (2013.01); *G11B 17/0284* (2013.01);
(Continued)

(58) Field of Classification Search
None
See application file for complete search history.

(56) References Cited

U.S. PATENT DOCUMENTS 4,466,033 A * 8/1984 Jordan et al. ...... G11B 17/0286
360/99.05
4,541,025 A * 9/1985 Sidhu et al. ....... G11B 17/0286
360/99.05
(Continued)

FOREIGN PATENT DOCUMENTS

CN 212497739 U 2/2021
JP 2010102782 A 5/2010

OTHER PUBLICATIONS

Sony Electronics Inc., Meet the family, 2 pages, downloaded from https://pro.sony/ue_US/products/optical-disc, as early as Aug. 5, 2021.
(Continued)

*Primary Examiner* — Craig A. Renner
(74) *Attorney, Agent, or Firm* — John D. Henkhaus

(57) ABSTRACT

A removable disk clamp assembly for mounting disk media on a motor-driven spindle of a magnetic read-write device includes a disk clamp and a mechanism for generating a predetermined force to press the disk media to a flange of the spindle such that the predetermined force can be repeatedly overcome by an applied counterforce to remove the disk clamp from engagement with a hub of the spindle. Such a mechanism may include a spring-loaded removable disk clamp assembly or a magnetic removable disk clamp assembly, and whereby a vacuum-driven chuck may be employed for disk and clamp handling purposes, all of which are suitable for implementation and use in a read-write device configured for use in an archival data storage system library such as in a cleanroom storage system.

13 Claims, 10 Drawing Sheets

(51) Int. Cl.
*G11B 5/55* (2006.01)
*G11B 21/22* (2006.01)
*G11B 33/04* (2006.01)
*G11B 33/14* (2006.01)

(52) U.S. Cl.
CPC ........ *G11B 19/2009* (2013.01); *G11B 5/5526* (2013.01); *G11B 21/22* (2013.01); *G11B 33/0461* (2013.01); *G11B 33/1446* (2013.01)

(56) References Cited

U.S. PATENT DOCUMENTS

| | | | |
|---|---|---|---|
| 4,570,194 A | | 2/1986 | Schatteman |
| 4,575,837 A | * | 3/1986 | Okita ................. G11B 17/0284 360/99.05 |
| 4,853,924 A | | 8/1989 | Takahashi et al. |
| 5,006,945 A | * | 4/1991 | Furusawa .......... G11B 17/0288 360/99.12 |
| 5,291,001 A | | 3/1994 | Krayer et al. |
| 5,485,436 A | | 1/1996 | Forget et al. |
| 6,246,654 B1 | * | 6/2001 | Omori et al. ...... G11B 17/0288 720/604 |
| 6,438,087 B2 | * | 8/2002 | Omori ................ G11B 17/0288 720/604 |
| 7,904,918 B2 | | 3/2011 | Saji et al. |
| 8,553,518 B1 | | 10/2013 | Ekhoff |
| 8,645,982 B2 | * | 2/2014 | Yoon .................. G11B 17/0284 720/697 |
| 11,443,775 B1 | | 9/2022 | Herdendorf et al. |
| 2003/0107983 A1 | | 6/2003 | Kim et al. |

OTHER PUBLICATIONS

Sony Electronics Inc., PetaSite Scalable Solutions, 5 pages, downloaded from https://pro.sony/ue_US/products/optical-disc/petasite-solutions, as early as Aug. 5, 2021.

Korean Intellectual Property Office (ISA/KR), PCT International Search Report and Written Opinion for International application No. PCT/US2022/028224, Sep. 23, 2022, 10 pages.

* cited by examiner

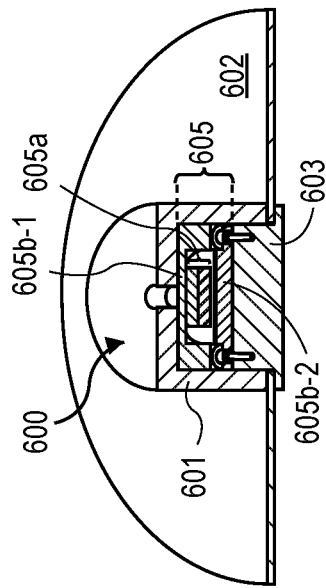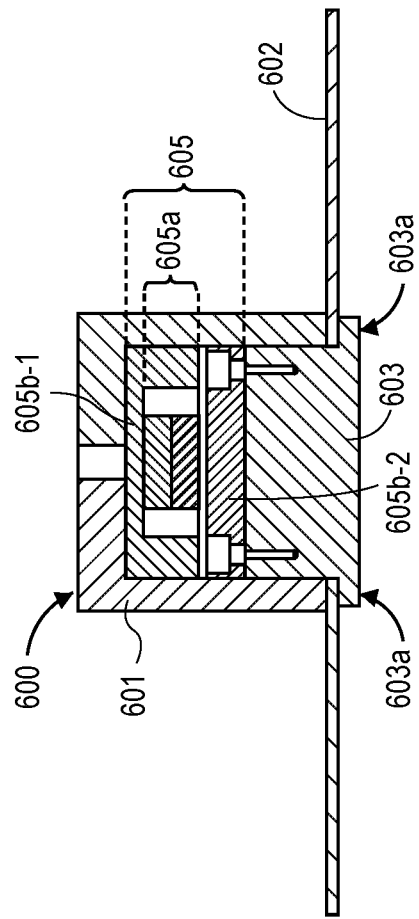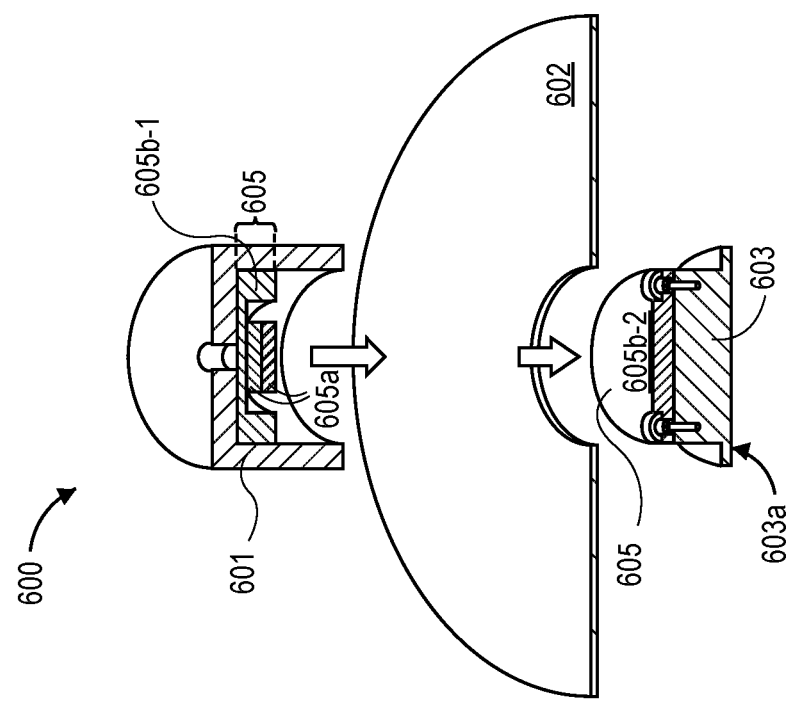

REMOVABLE DISK CLAMP FOR READ-WRITE DEVICE IN ARCHIVAL DATA STORAGE LIBRARY

FIELD OF EMBODIMENTS

Embodiments of the invention may relate generally to data storage systems and, more particularly, to a read-write device for an archival data storage library.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

There is an increasing need for archival data storage. Magnetic tape is a traditional solution for data back-up, but is notably slow in accessing the stored data. Current archives are increasingly "active" archives, meaning some level of continuing random read data access is required. In terms of magnetic media cost, magnetic disks in HDDs have the lowest demonstrated cost per terabyte (e.g., $/Tb). Furthermore, magnetic disks are known to have a relatively lengthy useful life, especially when maintained in a controlled environment, whereby the magnetic bits on the media will remain stable for a relatively long time.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 6A is an exploded view illustrating a magnetic removable disk clamp for a read-write device, according to an embodiment;

FIG. 6B is a cross-sectional perspective view illustrating the removable disk clamp of FIG. 6A, according to an embodiment;

FIG. 6C is a cross-sectional side view illustrating the removable disk clamp of FIG. 6A, according to an embodiment;

DETAILED DESCRIPTION

Figure 1:
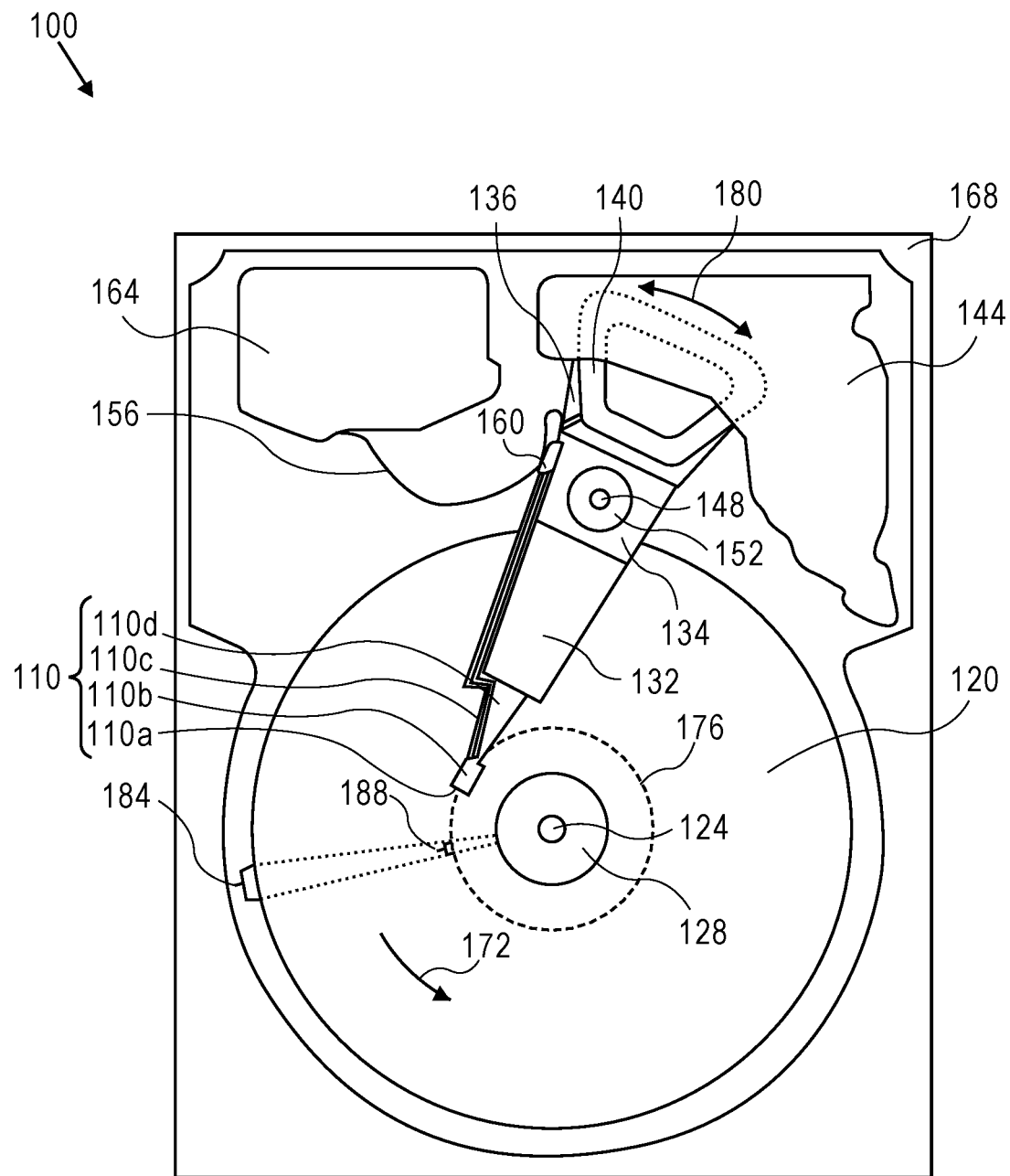
FIG. 1 is a plan view illustrating a hard disk drive (HDD), according to an embodiment.

Generally, approaches to a removable disk clamp for a read-write device configured for use in an archival data storage library are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak-free. Hence, the concept of a desired or target "leak rate" may be used herein.

Context

Recall that there is a significant need for archival data storage, and that magnetic disks in hard disk drives (HDDs) have some advantages over other magnetic media in the context of archival (or "cold") data storage. With respect to reducing the overall cost per byte ($/Tb) of magnetic disk-based storage systems, the costs associated with the read-write head, the mechanical structures, and the electronics might be reduced. Also, increasing the number of disks per system is another way in which to further the $/Tb cost reduction goal. However, still in view of the foregoing, a vast magnetic disk "library" containing a significantly large number of magnetic recording disks is considered an ultimate low-cost solution to the challenges associated with archival data storage both now and into the future, and which would demonstrate a faster "time to first byte" than tape (e.g., no tape winding needed) and a faster data rate than with optical disks.

Magnetic Disk Archival Data Storage Library

Figure 2:
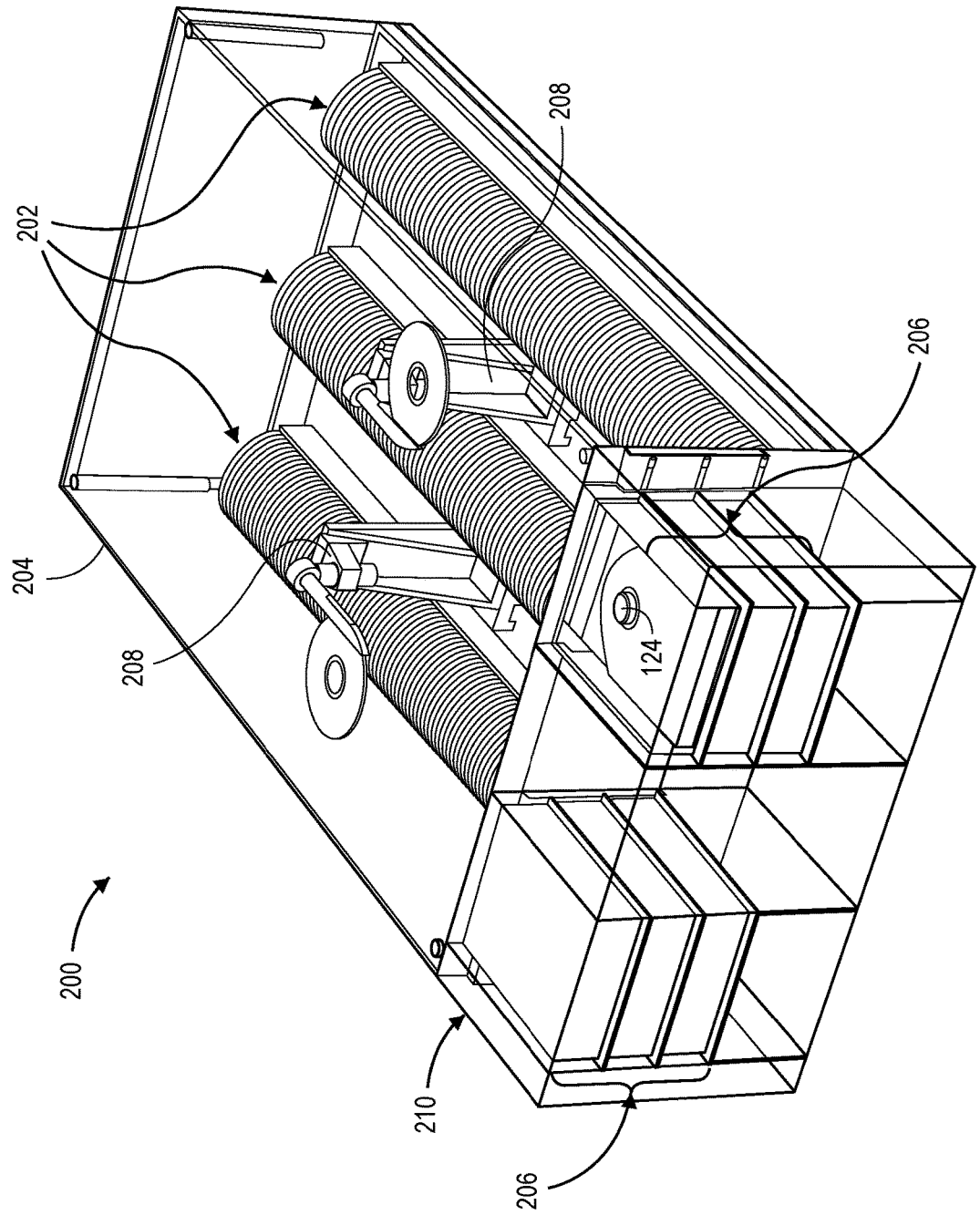
FIG. 2 is a perspective view illustrating an archival data storage system, according to an embodiment.

FIG. 2 is a perspective view illustrating an archival data storage system (or "data storage library"), according to an embodiment. Data storage system 200 (or simply "storage system 200") comprises a plurality of magnetic-recording disk media 202 (or simply "disk media 202"), such as one or more rows of disk media 202 as illustrated, at least one disk storage enclosure 204 in which the disk media 202 are housed, and at least one data storage device (DSD) 206 configured to write to and to read from the disk media 202, where DSD 206 is functionally and operationally the same as or largely similar to the hard disk drive (HDD) 100 of FIG. 1. However, a DSD 206 implemented similarly to HDD 100 may be decomposed or separated into multiple separate sub-assemblies, such as a first sub-assembly comprising the disk spindle 124 (FIG. 1) and associated components on which the disk media 202 are mounted for read-write operations and a second sub-assembly comprising a head-stack assembly (HSA) (FIG. 1) and associated components for reading from and writing to the disk media 202. The sub-assemblies of such a decomposed DSD 206 may be assembled at some distance from each other (such as for disk mounting clearance purposes for a non-limiting example) and configured for operationally engaging or interlocking (e.g., by translating or rotating) when needed for performance of read-write operations. With a data storage system comprising multiple DSDs, each DSD is typically communicative with and under the control of a system controller via a communication interface according to a corresponding communication protocol. Each DSD would include corresponding non-volatile memory (NVM) (e.g., typically in the form of spinning magnetic disk media in the case of HDDs) controlled by a respective device controller, which would be under some degree of control by the system controller.

Storage system 200 further comprises at least one automated disk handling mechanism 208 (e.g. a robotic machine, or robot) configured and programmed to transfer at least some of the disk media 202 between the disk storage enclosure 204 and one or more DSD 206. Some hard disk drive (HDD) manufacturing processes utilize automated disk handling machines (e.g., a "pick and place" robot to load disks onto a spindle), which may be modified or otherwise implemented for use for this purpose, for a non-limiting example. Additionally, storage system 200 comprises a hermetic (or temporarily, or semi-hermetic) enclosure 210 configured for containing the disk media 202, the disk storage enclosure(s) 204, the at least one DSD 206, and the at least one disk handling mechanism 208. Thus, the hermetic enclosure 210 of this version of the storage system 200 depicted in FIG. 2 is referred to as a rack-mountable enclosure, whereby the storage system 200 can be employed in a conventional or non-conventional electronics equipment rack. Here, with storage system 200, a corresponding system controller may be further configured and programmed to communicate with and to manage and control the automated machinery, e.g., the disk handling mechanism 208, to the extent that control is not integrated directly into the automated machinery.

Because modern HDDs fly the read-write head so very close to the disk surface, the presence of surface contaminants attached to either the head slider and/or the disk can cause undesirable flying height changes which increases the likelihood of head-disk contact (or "crash") and thus read-write (I/O) errors. Conventional HDDs operate in a "clean" environment, i.e., a sealed operating environment relatively free of contaminant particles, outgases, and the like, which is typically maintained after manufacturing by utilizing one or more internal filters. Breather and/or other HDD filters often are designed and configured to serve multiple functions, such as absorbing contaminants, adsorbing contaminants, controlling humidity, and the like. Because, with an HDD implemented for use as a DSD 206, the disk media 202 need to be loaded onto and unloaded from a disk spindle 124 during operation of the storage system 200, in contrast with a conventional HDD the DSD 206 is unsealed or "open" (although it may be implemented with, for example, a DSD enclosure comprising a movable and/or removable cover with an opening/closing mechanism and a gasket seal for temporary sealing purposes when closed). Hence, according to an embodiment, the DSD 206 and the disk media 202 are both enclosed in the larger hermetic enclosure 210 to provide some degree of sealing for contaminant control and management purposes. According to an embodiment, storage system 200 further comprises an air/gas circulation system (see, e.g., circulation system 312 of FIG. 3B) configured to continuously filter and/or remove contaminants from the internal environment of the hermetic enclosure 210, such as by use of a circulation fan(s) and a filter(s) (e.g., a HEPA (high-efficiency particulate air) filter) for a non-limiting example.

Archival Data Storage Library in a Cleanroom Environment

Figure 3A:
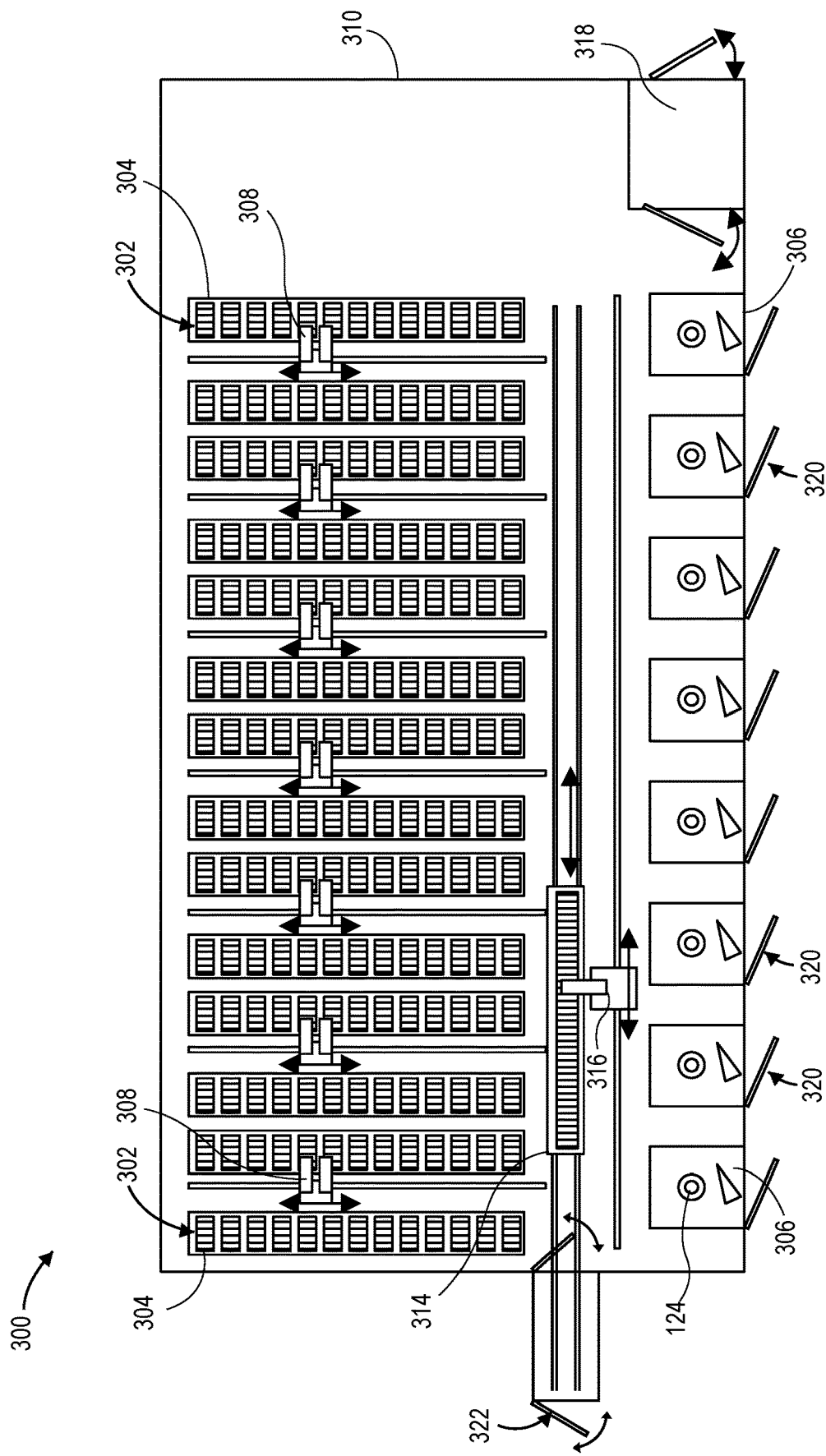
FIG. 3A is a top view illustrating an archival data storage system, according to an embodiment.
Figure 3B:
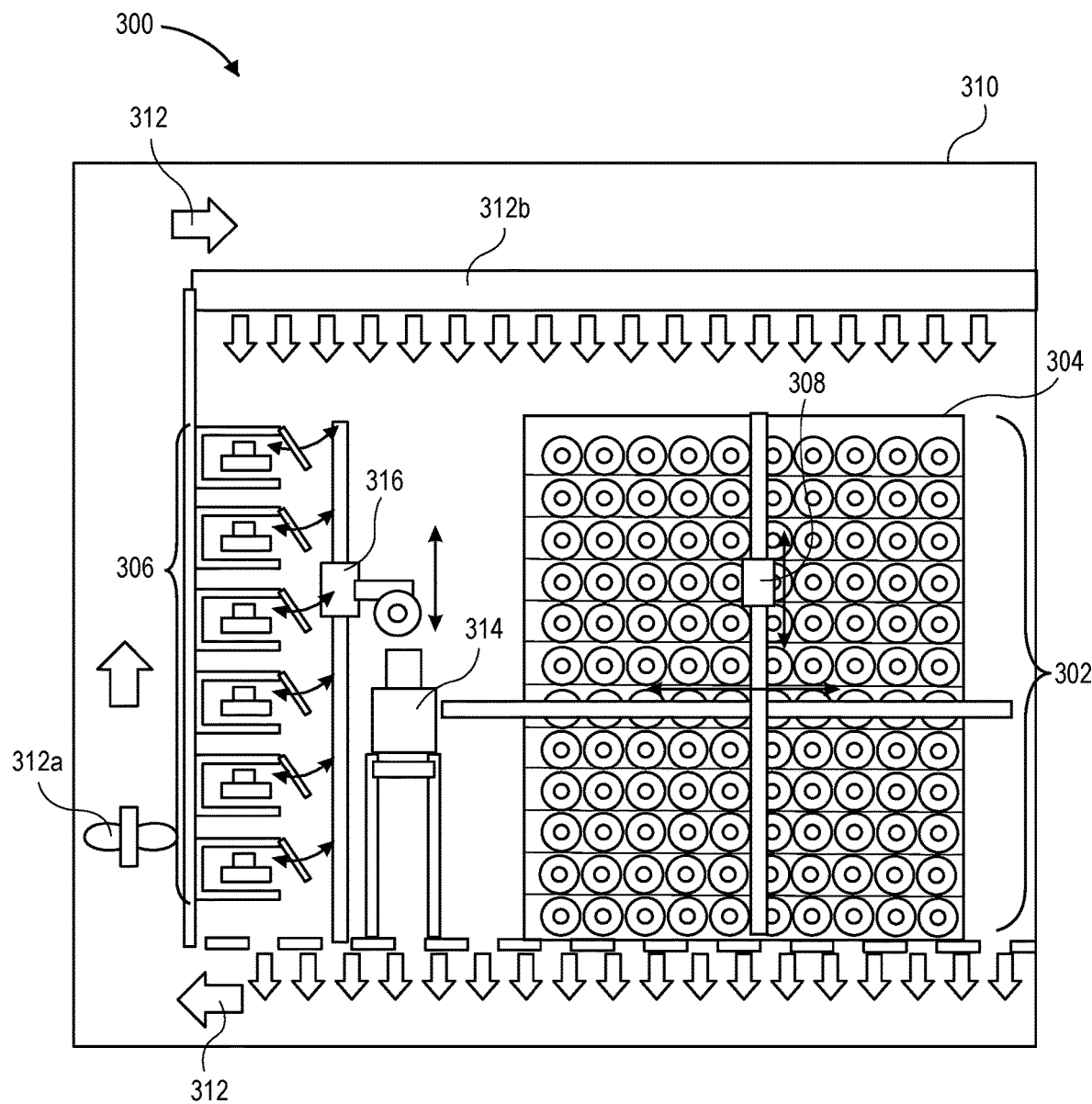
FIG. 3B is a side view illustrating the archival data storage system of FIG. 3A, according to an embodiment.

FIG. 3A is a top view illustrating an archival data storage system, and FIG. 3B is a side view illustrating the archival data storage system of FIG. 3A, according to an embodiment. Data storage system 300 (or simply "storage system 300") comprises a plurality of magnetic-recording disk media 302 (or simply "disk media 302"), a plurality of disk storage enclosures 304 in which the disk media 302 are housed, and a plurality of data storage devices (DSD) 306 configured to write to and to read from the disk media 302 (not all similar units are labeled here, for purposes of illustrative simplicity and clarity), where DSD 306 is functionally and operationally the same as or similar to the hard disk drive (HDD) 100 of FIG. 1. According to an embodiment and as depicted, the disk media 302 includes multiple rows of one or more racks and/or shelves of disk media 302, where the disk storage enclosures 304 include the racks of shelves housing and storing the disk media 302. Furthermore, the DSDs 306 include an array or matrix of DSDs (e.g., a rectangular arrangement of units) as depicted in FIG. 3B and according to an embodiment. As with DSD 206 (FIG. 2), DSD 306 may be decomposed or separated into multiple separate sub-assemblies configured for operationally engaging or interlocking when needed for performance of read-write operations. As described in reference to storage system 200 (FIG. 2), each DSD is typically communicative with and under the control of a system controller via a communication interface according to a corresponding communication protocol. Each DSD would include corresponding non-volatile memory (NVM) (e.g., typically in the form of spinning magnetic disk media in the case of HDDs) controlled by a respective device controller, which would be under some degree of control by the system controller.

Storage system 300 further comprises at least one automated disk handling mechanism 308 (e.g. a translatable robotic machine, such as a "pick and place" robot) configured and programmed to transfer disk media 302 between a disk storage enclosure 304 in a disk storage area and ultimately to one or more of the DSDs 306. Again, automated disk handling machines used in HDD manufacturing may be modified or otherwise implemented for use for this purpose, such as by mounting on a translating mechanism(s) (e.g., a cart on a track(s)) for automated movement along a rack or a row of racks and up and down the shelves of a rack for access to individual disk media 302 (or containers, cassettes, cartridges of disk media 302), for a non-limiting example. According to an embodiment, disk storage enclosure 304 comprises a container comprising a lid or cover configured to open (e.g., for disk media 302 access) and to close (e.g., for safe storage of the disk media 302 and for transporting the disk media 302 to and from the storage system 300), and disk handling mechanism 308 (and/or a disk loading mechanism 316) is configured to open and close the lid of the container for access to the individual disk media 302 stored therein. Thus, the disk media 302 are protected from external contamination during storage, handling of disk media 302 is easier than with individual disks, and the container with disk media 302 inside can be removed from the storage system (e.g., from a hermetic enclosure 310) for transportation if necessary. Furthermore, multiple disk storage containers can therefore be stored on each shelf of each of a plurality of racks, and the disk handling mechanism 308 may be configured to operate to handle a container of disk media 302 rather than or in addition to individual disk media 302.

Additionally, storage system 300 comprises a hermetic enclosure 310 configured for containing the disk media 302, the disk storage enclosures 304, the DSDs 306, and the disk handling mechanisms 308. Thus, the hermetic enclosure 310 of this version of a storage system (storage system 300) depicted in FIGS. 3A-3B is referred to as a cleanroom. As generally well-understood, cleanrooms are designed to maintain extremely low levels of particulates such as dust, airborne organisms, vaporized particles, and the like, and typically rely on a constant, highly-filtered air flow to entrap and/or flush out contaminants and impurities. Again, with an HDD implemented for use as a DSD 306, the disk media 302 need to be loaded onto and unloaded from a disk spindle 124 during operation. Therefore, the DSD 306 is unsealed or "open" (although it may be implemented with, for example, a DSD enclosure comprising a movable and/or removable cover with an opening/closing mechanism and a gasket seal for temporary sealing purposes when closed). According to an embodiment, all the data storage components of the storage system 300 (disk media 302, disk storage enclosures 304, DSDs 306, disk handling mechanisms 308) are enclosed in the larger hermetic enclosure 310, i.e., the cleanroom, to provide contaminant control.

According to an embodiment, storage system 300 further comprises an air/gas circulation system 312 (generally depicted with block arrows in FIG. 3B) configured to continuously filter and/or remove contaminants from the internal environment of the hermetic enclosure 310. According to an embodiment, circulation system 312 comprises one or more circulation fan(s) 312a for blowing air down from the ceiling through one or more filter(s) 312b (for non-limiting examples, a HEPA (high-efficiency particulate air) filter and/or a ULPA (ultra-low penetration air) filter). Typically, this type of cleanroom circulation system 312 further comprises floor panels having many holes through which the air is exhausted to the space below and circulated back to the ceiling filters 312b in a closed loop. Furthermore and according to an embodiment, storage system 300 (and the storage system 200 of FIG. 2) further comprises one or more access means for access to the inside of the hermetic enclosure 310 (or the hermetic enclosure 210 of FIG. 2).

According to a related embodiment in which the hermetic enclosure 310 is implemented as a cleanroom, the access means are configured for personnel to enter and exit the hermetic enclosure 310. For example, the cleanroom may be provisioned with an intermediate room 318 having a double-door and an air shower for inhibiting the introduction of external particulates into the hermetic enclosure 310. As such, a person (e.g., maintenance personnel) entering the hermetic enclosure 310 (e.g., in a clean suit, commonly and colloquially referred to as a "bunny suit") first enters the intermediate room 318, where particulates are removed from the person via the air shower after the external door is closed, and then proceeds to enter the hermetic enclosure 310 once the air shower shuts off and the internal door is opened.

According to an embodiment, storage system 300 further comprises an automated disk handling shuttle 314 (e.g. a translatable robotic machine) configured to receive disk media 302 (or containers of disk media 302, as described elsewhere herein) from the disk handling mechanisms 308, and an automated disk loading mechanism 316 (e.g. a translatable robotic machine, such as a "pick and place" robot) configured to access the disk media 302 from the disk handling shuttle 314 and to install or mount the disk media 302 into/onto the disk spindle 124 of the DSDs 306, and which may be further configured to open and close a container of disk media 302 and a DSD 306 cover. According to an embodiment, each disk handling mechanism 308 is configured to move between rows of disk storage enclosures 304, where the disk storage enclosures 304 may comprise racks of shelves housing and storing the disk media 302, and where the automated disk handling shuttle 314 is configured to move across the rows to receive disk media 302 from disk handling mechanism(s) 308. Further, the automated disk loading mechanism 316 is configured to access the disk media 302 from the disk handling shuttle 314 and to install the disk media 302 into/onto one of the DSDs 306. Thus, a single disk handling shuttle 314 may be implemented to move across the rows of disk storage enclosures 304 to receive disk media 302 from multiple disk handling mechanisms 308 (such as a single disk handling mechanisms 308 per row, for a non-limiting example). With storage system 300, a corresponding system controller may be further configured and programmed to communicate with and to manage and control the automated machinery (e.g., disk handling mechanisms 308, disk handling shuttle 314, and/or disk loading mechanism 316), to the extent that control is not integrated directly into the automated machinery.

In an implementation in which the hermetic enclosure 310 is implemented as a cleanroom, according to an embodiment the storage system 300 further comprises at least one first service door 320 positioned adjacent to (e.g., behind) and configured for use in replacing one or more DSD 306. Thus, failed DSDs 306 can be replaced without entering the hermetic enclosure 310, e.g., the cleanroom. Furthermore and according to an embodiment, the storage system 300 further comprises at least one second service door 322 configured for use in adding or removing disk media 302 from the hermetic enclosure 310 of storage system 300. This second service door 322 may be implemented similarly to a double door as conventionally used for entering and exiting a cleanroom, and is preferably located at one end of the disk handling shuttle 314 path/track.

Disk Clamp for Read-Write Device in an Archival Data Storage Library

Data storage devices (DSDs) referred to elsewhere herein as DSD 206, 306 (FIGS. 2-3B) are also generally referred to herein as a read-write device (RWD) in part because such a device is, according to embodiments, configured differently than a conventional spinning-disk magnetic-recording device such as a hard disk drive (HDD). For example, in the context of an archival data storage system library 200, 300 (FIGS. 2-3B) which employs disk media such as disk media 202, 302 (FIGS. 2-3B), such disk media 202, 302 need to be temporarily mounted and clamped onto a disk spindle 124 (FIGS. 2, 3A) for operation within each DSD 206, 306 and then unclamped and unmounted from the disk spindle 124 for storage such as within a disk enclosure 204, 304 (FIGS. 2-3B). Hence, a temporary, removable disk clamp is desirable, which can be readily manipulated by an automated machine, e.g., a robot. By contrast, conventional disk clamps typically use threaded fasteners (e.g., screws) to clamp the disk stack onto the spindle within the device. However, use of screws is not considered a good solution for this application because repeated screw tightening and removal would likely create a non-trivial amount of particles (i.e., particulate contaminants) from the contact forces. Furthermore, the clamping force can be much lower here than with a conventional HDD disk clamp at least in part because a conventional HDD disk clamp force is chosen such that disk "slip" is minimal during a non-operational shock event (e.g., non-operational shock specification is typically hundreds of times the force of gravity (g) and, therefore, a very high clamping force is required for typical HDDs).

Figure 4A:
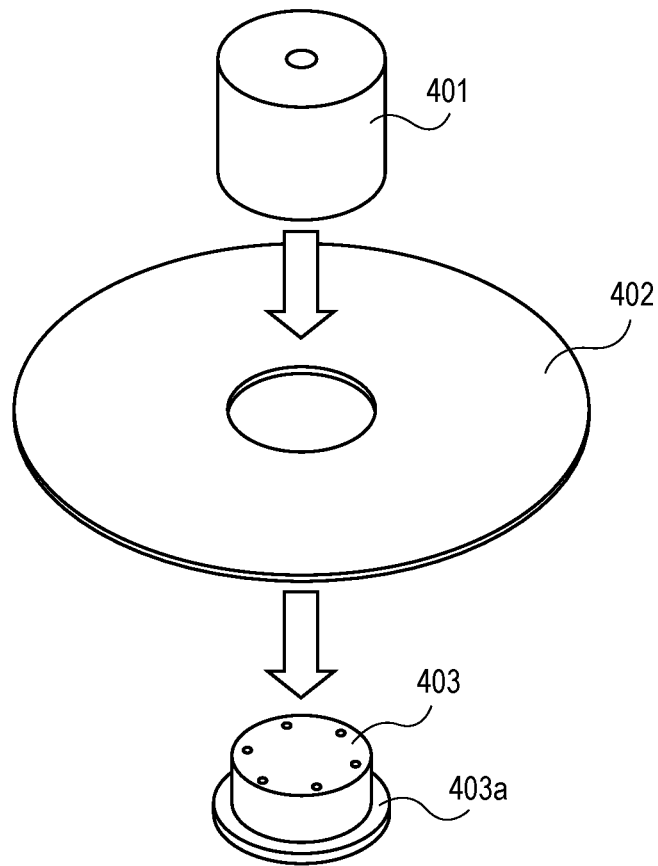
FIG. 4A is an exploded view illustrating a removable disk clamp for a read-write device, according to an embodiment.
Figure 4B:
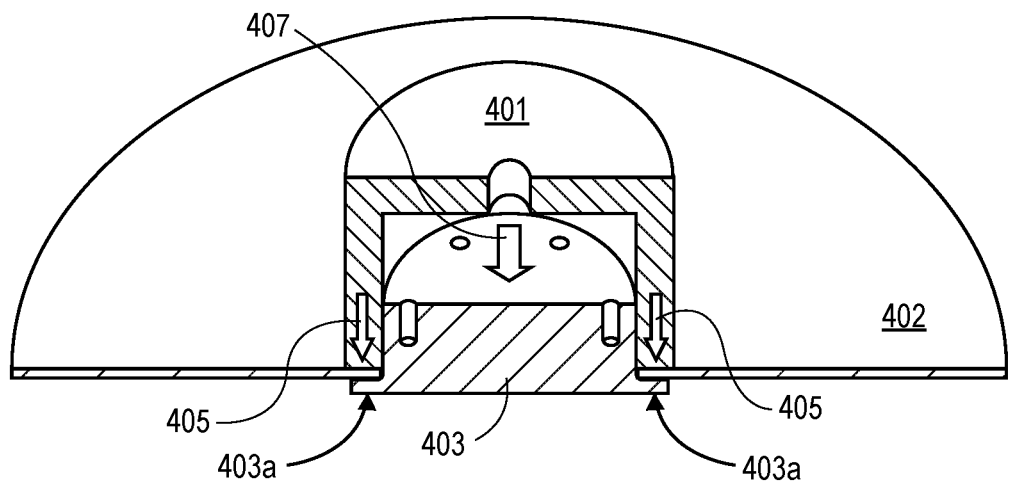
FIG. 4B is a cross-sectional perspective view illustrating the removable disk clamp of FIG. 4A, according to an embodiment.

FIG. 4A is an exploded view illustrating a removable disk clamp for a read-write device, and FIG. 4B is a cross-sectional perspective view illustrating the removable disk clamp of FIG. 4A, both according to an embodiment. Generally, a temporary or removable disk clamp 401 includes a mechanism (e.g., non-threaded, in contrast with conventional disk clamps) configured to generate a predetermined clamping force 405 (depicted as block arrows) that presses a magnetic-recording disk 402 surface to the flange 403a of a spindle 403 (see, also, spindle 124 of FIGS. 1-3A). Further, a mechanism is needed to temporarily hold the disk clamp 401 to the spindle 403 whereby the temporary holding mechanism or holding force 407 (depicted as block arrow) can be released by a simple action. In implementations, the clamping mechanism that generates the disk clamping force and the temporary holding mechanism that holds the disk clamp onto the spindle may rely on the same mechanism(s).

Figure 5A:
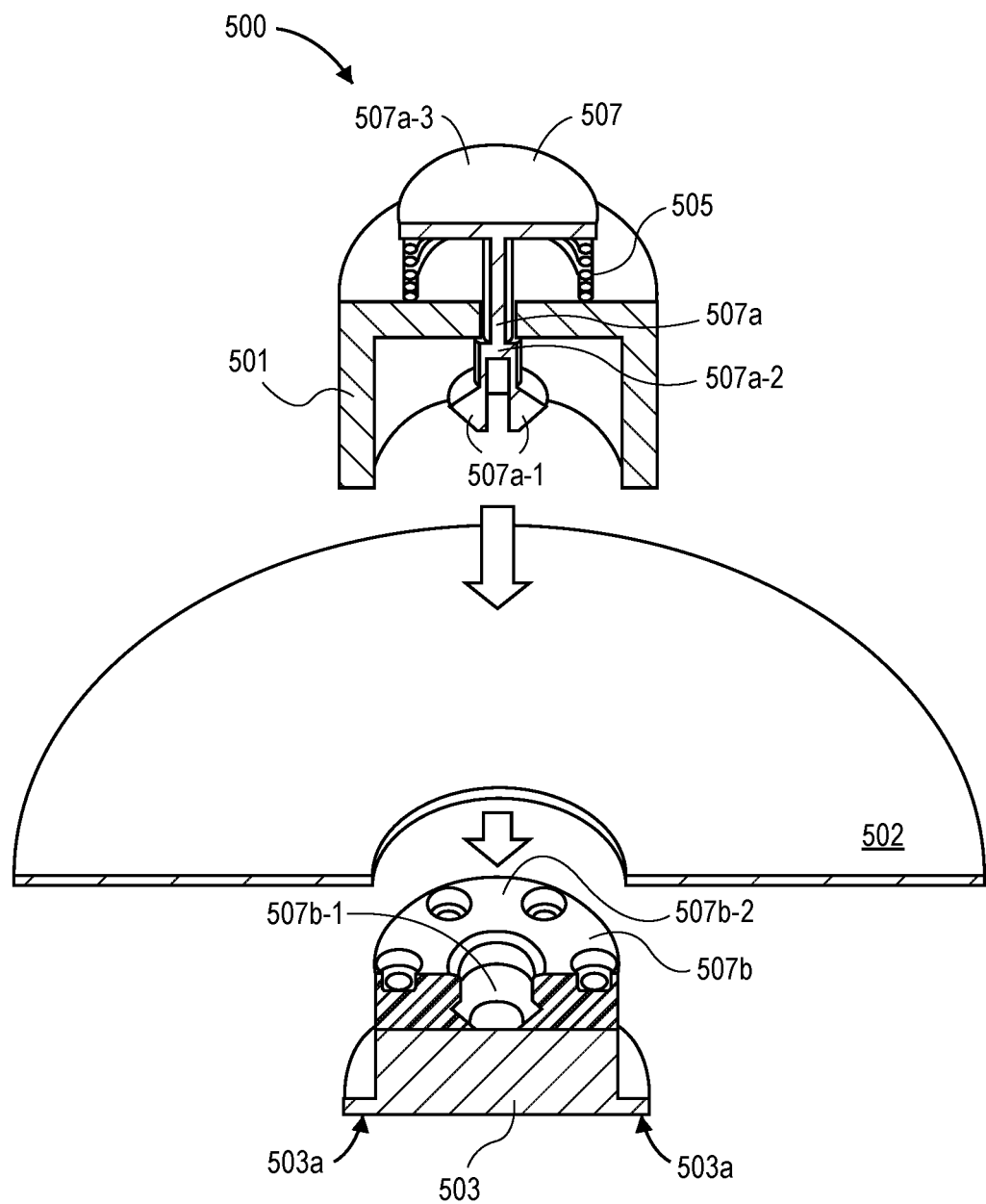
FIG. 5A is an exploded view illustrating a spring-loaded removable disk clamp for a read-write device, according to an embodiment.
Figure 5B:
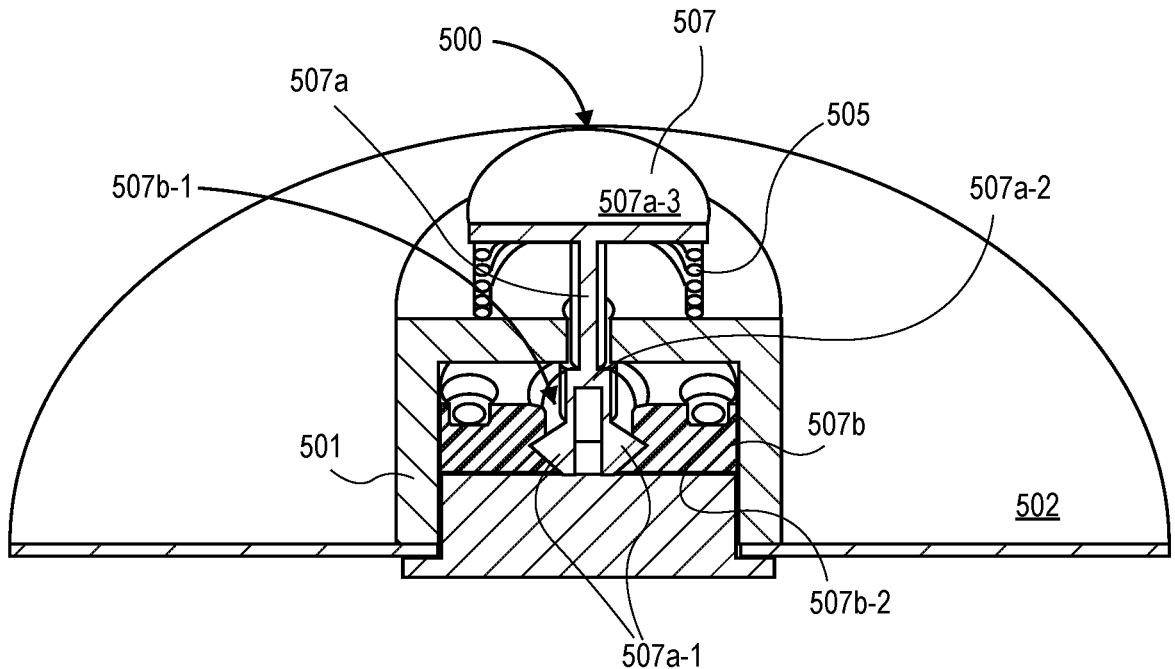
FIG. 5B is a cross-sectional perspective view illustrating the removable disk clamp of FIG. 5A, according to an embodiment.
Figure 5C:
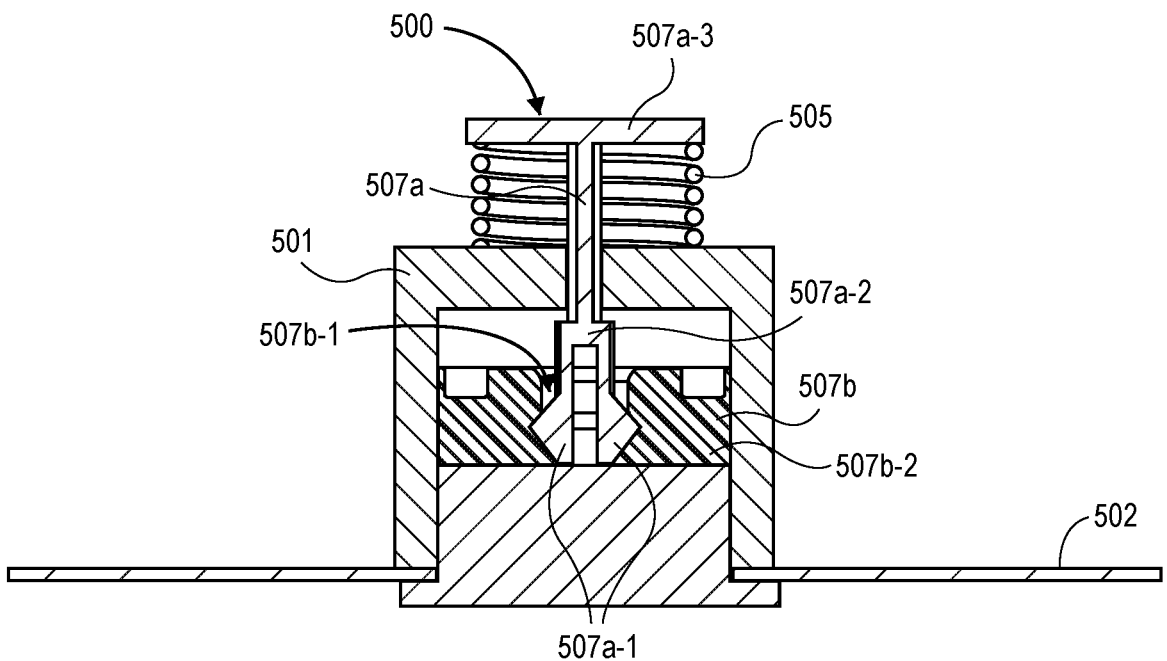
FIG. 5C is a cross-sectional side view illustrating the removable disk clamp of FIG. 5A, according to an embodiment.

FIG. 5A is an exploded view illustrating a spring-loaded removable disk clamp for a read-write device, FIG. 5B is a cross-sectional perspective view illustrating the removable disk clamp of FIG. 5A, and FIG. 5C is a cross-sectional side view illustrating the removable disk clamp of FIG. 5A, all according to an embodiment, where FIGS. 5B-5C depict a clamped position or state. Spring-loaded removable disk clamp assembly 500 comprises a disk clamp 501 and a spring 505 configured to generate or provide at least in part the clamping force that presses disk media 502 to the flange 503a of a spindle 503 (see also, spindle 124 of FIGS. 1-3A). The spring 505 is positioned (and at least at times compressed) between a cap 507a-3 of a latch assembly 507 and a top surface of the disk clamp 501. The disk clamp assembly 500 further comprises a holding mechanism, for temporarily holding the disk clamp 501 to the spindle 503, which comprises a mechanical latch assembly 507 comprising a latch-arm 507a (or "claw") extending from the cap 507a-3. The latch-arm 507a is coupled with and extends through the disk clamp 501 and is configured for insertion into a latch-receptacle 507b (or "receiver") coupled with and fixed to the spindle 503, where the latch-receptacle 507b is configured to receive and hold one or more nubs 507a-1 of the latch-arm 507a. The latch-arm 507a comprises one or more nubs 507a-1 protruding generally radially from a hollowed main arm portion 507a-2 (i.e., hollowed to provide some flexibility and elasticity to the main arm portion 507a-2) of the latch-arm 507a which, when inserted into a receptacle 507b-1 (or "orifice") in a main body 507b-2 of the latch-receptacle 507b, forms a mechanical latch fastener to hold the disk clamp 501 to the spindle 503 hub with the disk media 502 secured therebetween. Removable disk clamp assembly 500 is designed and configured such that the nubs 507a-1 of the latch-arm 507a are readily releasable from the receptacle 507b-1 of the latch-receptacle 507b in response to a reasonable amount of force, e.g., such that a robotic machine (or otherwise) can release latch-arm 507a from latch-receptacle 507b by applying a pulling (e.g., tensile) force on the latch-arm 507a.

FIG. 6A is an exploded view illustrating a magnetic removable disk clamp for a read-write device, FIG. 6B is a cross-sectional perspective view illustrating the removable disk clamp of FIG. 6A, and FIG. 6C is a cross-sectional side view illustrating the removable disk clamp of FIG. 6A, all according to an embodiment, where FIGS. 6B-6C depict a clamped position or state. Magnetic removable disk clamp assembly 600 comprises a disk clamp 601 and a magnetic mechanism 605 configured to generate or provide the clamping force that presses disk media 602 to the flange 603a of a spindle 603 (see also, spindle 124 of FIGS. 1-3A), as well as the holding mechanism for temporarily holding the disk clamp 601 to the spindle 603 hub. The magnetic mechanism 605 comprises a permanent magnet 605a (depicted as with two separate pole pieces) disposed within the disk clamp 601, along with first magnetic material 605b-1 positioned on one side of the permanent magnet 605a (e.g., above permanent magnet 605a) and second magnetic material 605b-2 positioned on an opposing side of the permanent magnet 605a (e.g., below permanent magnet 605a), where the first and second magnetic material 605b-1, 605b-2 collectively function as a flux guide. The first magnetic material 605b-1 is disposed within the disk clamp 601 over the permanent magnet 605a, and the second magnetic material 605b-2 is coupled with and fixed to the spindle 603, below the permanent magnet 605a. Collectively, the permanent magnet 605a and the first and the second magnetic material 605b-1, 605b-2 are designed and configured to generate a magnetic attraction and force between the permanent magnet 605a and the magnetic materials 605b-1, 605b-2 (e.g., across a small gap between the first magnetic material 605b-1 and the second magnetic material 605b-2), thereby forming a magnetic clamp fastener to generate a magnetic clamping force to press the disk media 602 to the flange 603a of a spindle 603 and to hold the disk clamp 601 to the spindle 603 hub with the disk 602 secured therebetween. According to an embodiment, the permanent magnet 605a is disposed within the first magnetic material 605b-1, whereby the first magnetic material 605b-1 at least in part envelopes the permanent magnet on all but one side, e.g., for flux guiding purposes. Here too the removable disk clamp assembly 600 is designed and configured such that the magnetic force between the permanent magnet 605a and the magnetic materials 605b-1, 605b-2 is readily overcome in response to a reasonable amount of force, e.g., such that a robotic machine (or otherwise) can release disk clamp 601 from the magnetic material 605b-2 by applying a pulling (e.g., tensile) force on the disk clamp 601.

Vacuum-Based Disk Chuck for Use with a Removable Disk Clamp

Figure 7:
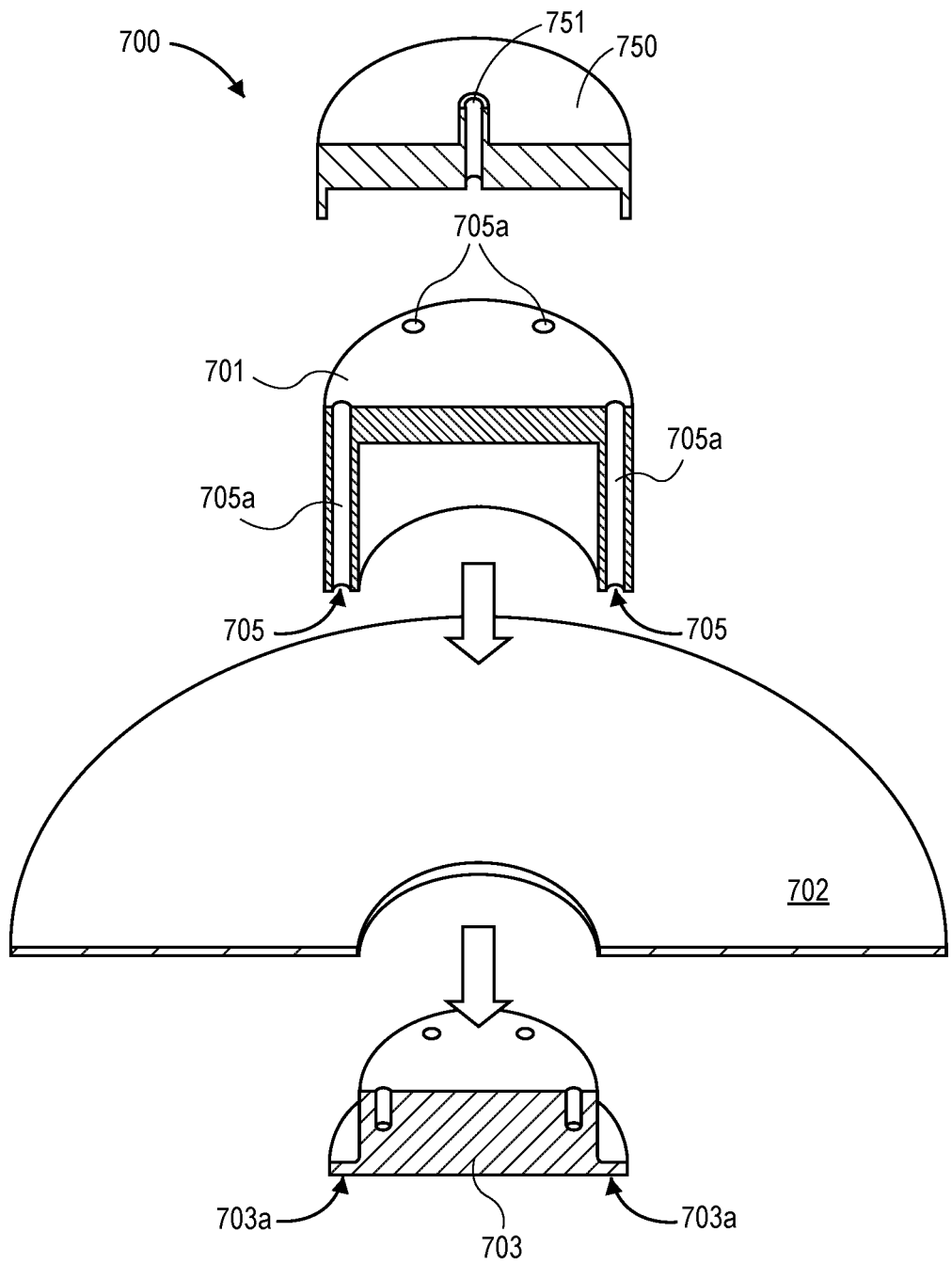
FIG. 7 is an exploded view illustrating a vacuum-based disk chuck for use with a removable disk clamp, according to an embodiment.

FIG. 7 is an exploded view illustrating a vacuum-based disk chuck for use with a removable disk clamp, according to an embodiment. Vacuum disk chuck assembly 700 comprises a disk clamp 701 comprising a vacuum mechanism 705 configured to facilitate or hold a vacuum pressure or force through the disk clamp 701 to operate as a vacuum chuck for temporary holding of a disk media 702 and the disk clamp 701 on a robotic machine. The illustration of disk clamp 701 is intended as a conceptual generalization of the previously-described disk clamp 401, 501, 601 (FIGS. 4-6C), whereby each respective clamping mechanism (e.g., spring 505 of FIGS. 5A-5C, magnetic mechanism 605 of FIGS. 6A-6C) is not shown here in order to maintain simplicity and clarity of concept. Stated otherwise, each disk clamp 401, 501, 601 may be implemented with the vacuum mechanism 705 of the disk chuck assembly 700, in addition to its respective foregoing clamping mechanism.

The vacuum mechanism 705 comprises one or more through-holes 705a through the disk clamp 701 and configured for applying a vacuum force(s) (or pressure) to the disk media 702 surface. With the assistance of an external vacuum source such as constituent to the robotic machine (or otherwise), comprising a suction cup 750 having a vacuum port 751 connected to the vacuum source (e.g., via tubing), a vacuum-driven chuck is formed to generate and hold a vacuum pressure to hold the disk clamp 701 and the disk media 702 during disk handling. For example, the suction cup 750 is pressed onto the top of the disk clamp 701 and the disk media 702, whereby then a vacuum source (e.g., within or associated with the robotic machine) is turned on and the disk clamp 701 and disk media 702 are consequently temporarily attached to the suction cup 750 by vacuum pressure. The suction cup 750, disk clamp 701, and disk media 702 are then loaded onto the spindle 703. The disk media 702 is attached to the spindle 703 by the disk clamp 701 according to a clamping mechanism described elsewhere herein (e.g., spring-latch, magnetic). Vacuum pressure is then turned off and the suction cup 750 that is attached to the robotic machine is released from the disk clamp 701 and disk media 702. After that, read-write operations may be performed. Once read-write operation(s) are completed, suction cup 750 is again pressed onto the top of the disk clamp 701 and disk media 702, whereby the vacuum source is then turned on again and the disk clamp 701 and disk media 702 are consequently temporarily attached to the suction cup 750 by vacuum pressure. Then, the disk clamp 701 and corresponding disk media 702 are removed from the spindle 703.

Vacuum disk chuck assembly 700 enables simple disk media 702 loading and unloading operations, whereby the vacuum (chuck) mechanism 705 is functionally integrated with the disk clamp 701. Hence, rather than the robotic machine having to operate in a more serial manner, i.e., to pick up a disk media 702 and load it onto the spindle 703 and then to pick a disk clamp 701 and load it onto the spindle 703 (i.e., requiring at least two loading operations and two different chucks, one for the disk media and one for the disk clamp), here the robotic machine is enabled to pick up a disk clamp 701 and then a disk media 702 by vacuum pressure and then load both the disk clamp 701 and the disk media 702 onto the spindle 703 by a single action. Similarly, the disk unloading operation involves the reverse of the foregoing procedure. Furthermore and according to an embodiment, the through-holes 705a are positioned around the outer perimeter of the disk clamp 701 and extend from the top through to the bottom of the disk clamp 701, where the disk clamp 701 mates with the top surface of the disk media 702, such that air can be drawn out of the through-holes 705a via the top of the disk clamp 701 and the intercoupled suction cup 750 under the vacuum pressure provided by the vacuum source.

Each of the foregoing embodiments of a removable disk clamp, i.e., removable disk clamp 401 (FIGS. 4A-4B), spring-loaded removable disk clamp assembly 500 (FIGS. 5A-5C), magnetic removable disk clamp assembly 600 (FIGS. 6A-6C), with or without the use of the vacuum removable disk clamp assembly 700 (FIG. 7), are suitable for implementation and use in a read-write device (RWD) configured for use in an archival data storage system, such as within DSDs 202, 302 (FIGS. 2-3B) according to embodiments. The physical and operational description of a digital data storage device (DSD) such as a hard disk drive (HDD), or a modified version of an HDD such as a RWD, is set forth in reference to FIG. 1. As described, example uses of temporary disk clamp assembly 401, 500, 600, 700 include in the context of an archival data storage system library such as within the rack-mountable data storage system 200 of FIG. 2 and/or the cleanroom data storage system 300 of FIGS. 3A-3B, both of which employ disk media such as disk media 202, 302 (FIGS. 2-3B) that need to be temporarily clamped to a corresponding disk spindle 403, 503, 603, 703 (FIGS. 4-7) for data read-write operational purposes.

Thus, such a data storage system 200, 300 would comprise a plurality of magnetic-recording disk media 202, 302, 402, 502, 602, 702 (FIGS. 2-7), at least one disk storage enclosure 204, 304 (FIGS. 2-3B) in which the disk media are housed, at least one DSD 206, 306 (FIGS. 2-3B) (or read-write device) configured to read from and to write to the disk media 202, 302, 402, 502, 602, 702, means for mounting (FIGS. 2-3B) the disk media 202, 302, 402, 502, 602, 702 onto the spindle 124, 403, 503, 603, 703 (FIGS. 2-7) of the at least one DSD 206, 306, and a hermetic enclosure 210, 310 (FIGS. 2-3B) containing the disk media 202, 302, 402, 502, 602, 702, the disk storage enclosure(s) 204, 304, the DSD(s) 206, 306, and the means for mounting. Furthermore, in the context of a cleanroom type storage system 300, the system 300 may further comprise means for receiving (FIGS. 3A-3B) the disk media 302 from the disk handling mechanism 308 (FIGS. 3A-3B) and means for accessing the disk media 302, 402, 502, 602, 702 from the means for receiving and for mounting the disk media 302, 402, 502, 602, 702 onto the spindle 124, 403, 503, 603, 703 of the DSD 206, 306.

Figure 8:
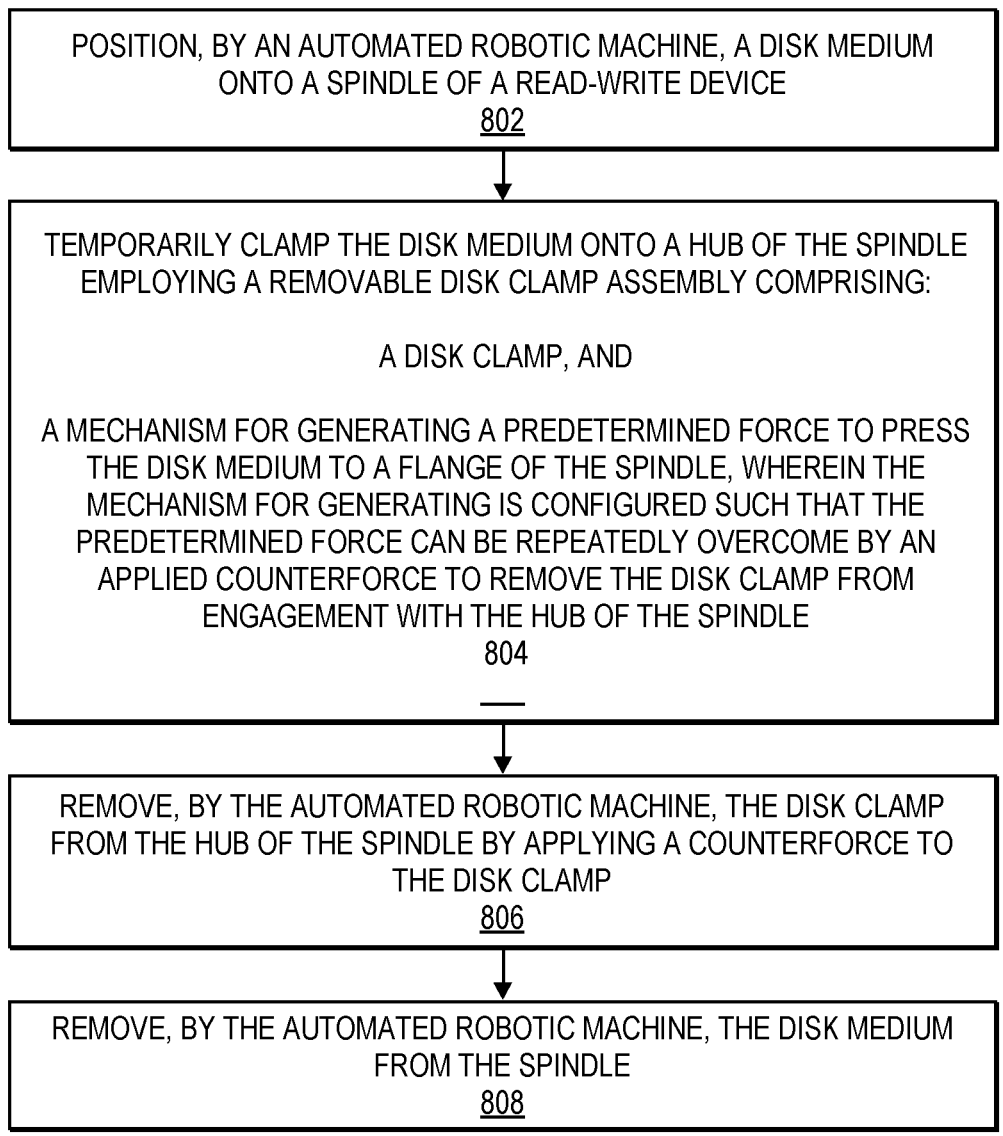
FIG. 8 is a flow diagram illustrating a method for operating a removable disk clamp of a read-write device in an archival data storage library, according to an embodiment.

Method for Operating a Removable Disk Clamp of a Read-Write Device in an Archival Data Storage Library FIG. 8 is a flow diagram illustrating a method for operating a removable disk clamp of a read-write device in an archival data storage library, according to an embodiment. Example uses include operating within DSD 206 (FIG. 2) in the rack-mountable data storage system 200 of FIG. 2 and/or DSD 306 (FIGS. 3A-3B) in the cleanroom data storage system 300 of FIGS. 3A-3B, as well as in similarly configured data storage systems.

At block 802 an automated robotic machine positions a magnetic-recording disk medium onto a spindle of a read-write device. For example, automated disk handling mechanism 208 (FIG. 2) or automated disk loading mechanism 316 (FIGS. 3A-3B) positions disk medium 202, 302, 402, 502, 602, 702 (FIGS. 2-7) onto disk spindle 124, 403, 503, 603, 703 (FIGS. 2-7) of DSD 206, 306 (FIGS. 2-3B), or a modified hard disk drive (HDD) or a read-write device (RWD).

At block 804 the automated robotic machine temporarily clamps the disk medium onto a hub of the spindle employing a removable disk clamp assembly comprising a disk clamp and a mechanism for generating a predetermined force to press the disk medium to a flange of the spindle, where the mechanism for generating is configured so that the predetermined force can be repeatedly overcome by an applied counterforce to remove the disk clamp from engagement with the hub of the spindle. For example, the automated disk handling mechanism 208 or the automated disk loading mechanism 316 clamps the disk medium 202, 302, 402, 502, 602, 702 onto a hub of the disk spindle 124, 403, 503, 603, 703, employing a removable disk clamp assembly 401, 500, 600, 700 (FIGS. 4-7) comprising a disk clamp 401, 501, 601, 701 (FIGS. 4-7) and a mechanism such as mechanical latch assembly 507 (FIGS. 5A-5C) or magnetic mechanism 605 (FIGS. 6A-6C) for generating a predetermined force to press the disk medium 202, 302, 402, 502, 602, 702 to a flange 403a, 503a, 603a, 703a (FIGS. 4-7) of the spindle 124, 403, 503, 603, 703, where the mechanism 507, 605 for generating is configured so that the predetermined force can be repeatedly overcome by an applied counterforce to remove the disk clamp 401, 501, 601, 701 from engagement with the hub of the spindle 124, 403, 503, 603, 703.

At block 806 the automated robotic machine removes the disk clamp from the hub of the spindle by applying a counterforce to the disk clamp. For example, the automated disk handling mechanism 208 or the automated disk loading mechanism 316 removes the disk clamp 401, 501, 601, 701 from the hub of the spindle 124, 403, 503, 603, 703 by applying a counterforce to the disk clamp 401, 501, 601, 701.

At block 808 the automated robotic machine removes the disk medium from the spindle. For example, the automated disk handling mechanism 208 or the automated disk loading mechanism 316 removes the disk medium 202, 302, 402, 502, 602, 702 from the spindle 124, 403, 503, 603, 703 (e.g., for ultimate return to a disk enclosure such as disk enclosure 204, 304 (FIGS. 2-3B) of data system ("library") 200, 300). Note that if the vacuum removable disk clamp assembly 700 is employed, then blocks 802 and 804 may be executed as a single action by the automated robotic machine and blocks 806 and 808 may be executed as a single action by the automated robotic machine.

Physical Description of an Illustrative Operating Context

Embodiments may be implemented in the context of digital data storage devices (DSDs) such as hard disk drive (HDDs) or modified HDDs. Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A removable disk clamp assembly for mounting a disk medium on a motor-driven spindle, the disk clamp assembly comprising:

a disk clamp; and a mechanical latch assembly configured for generating a force to press the disk medium to a flange of the spindle, the mechanical latch assembly comprising:

a latch-arm coupled with and extending through the disk clamp to the spindle and configured for insertion into a latch-receptacle, the latch-arm comprising:
  a hollowed arm portion, and
  a plurality of nubs protruding from the hollowed arm portion which, while inserted into a central receptacle of the latch-receptacle, forms a mechanical latch fastener to hold the disk clamp to the spindle with the disk medium secured therebetween, and
the latch-receptacle fixed to the spindle and configured to receive and temporarily hold the latch-arm;
wherein the mechanical latch assembly is configured such that the force can be repeatedly overcome by an applied counterforce to remove the disk clamp from engagement with the spindle.

2. The disk clamp assembly of claim 1, wherein the mechanical latch assembly further comprises:
  a cap from which the latch-arm extends; and
  a spring positioned between the cap and a top surface of the disk clamp.

3. The disk clamp assembly of claim 1, wherein the disk clamp comprises:
  a vacuum mechanism comprising one or more through-holes extending from the top of the disk clamp through to the bottom of the disk clamp and configured for receiving vacuum pressure and applying the pressure to where the disk clamp mates with a surface of the disk medium.

4. The disk clamp assembly of claim 3, wherein the one or more through-holes are positioned around the outer perimeter of the disk clamp.

5. A data storage system comprising the disk clamp assembly of claim 1.

6. The data storage system of claim 5, further comprising:
  an automated robotic machine configured to apply the counterforce to remove the disk clamp from engagement with the spindle.

7. A data storage system comprising:
  a plurality of magnetic-recording disk media;
  at least one disk storage enclosure in which the plurality of disk media is housed;
  at least one magnetic read-write device (RWD) configured to read from and to write to the plurality of disk media; and
  means for mounting a disk medium onto a spindle of the at least one RWD, employing a removable disk clamp assembly, the removable disk clamp assembly comprising:
    a disk clamp, and
    a mechanical latch assembly configured for generating a force to press the disk medium to a flange of the spindle, the mechanical latch assembly comprising:
      a latch-arm coupled with and extending through the disk clamp to the spindle and configured for insertion into a latch-receptacle, the latch-arm comprising:
        a hollowed arm portion, and
        a plurality of nubs protruding from the hollowed arm portion which, while inserted into the latch-receptacle, forms a mechanical latch fastener to hold the disk clamp to the spindle with the disk medium secured therebetween, and
      the latch-receptacle fixed to the spindle and configured to receive and temporarily hold the latch-arm.

8. The data storage system of claim 7, wherein the mechanical latch assembly further comprises:
  a cap from which the latch-arm extends; and
  a spring positioned between the cap and a top surface of the disk clamp.

9. The data storage system of claim 7, further comprising:
  a hermetic enclosure containing the plurality of disk media, the at least one disk storage enclosure, the at least one RWD, and the means for mounting.

10. The data storage system of claim 9, wherein the hermetic enclosure is configured as a cleanroom, the data storage system further comprising:
  means for receiving the disk medium from a disk handling mechanism; and
  means for accessing the disk medium from the means for receiving and the means for mounting the disk medium onto the spindle of the at least one RWD.

11. The data storage system of claim 7, wherein the disk clamp comprises:
  a vacuum mechanism comprising one or more through-holes positioned around the outer perimeter of the disk clamp and extending from the top of the disk clamp through to the bottom of the disk clamp and configured for receiving vacuum pressure and applying the pressure to where the disk clamp mates with a surface of the disk medium.

12. A method for operating a removable disk clamp of a read-write device in an archival data storage library, the method comprising:
  positioning, by an automated robotic machine, a disk medium onto a spindle of a read-write device;
  temporarily clamping the disk medium onto a hub of the spindle employing a removable disk clamp assembly comprising:
    a disk clamp, and
    a mechanism for generating a predetermined force to press the disk medium to a flange of the spindle, the mechanism comprising a mechanical latch assembly comprising:
      a latch-arm coupled with and extending through the disk clamp to the spindle and configured for insertion into a latch-receptacle, the latch-arm comprising:
        a hollowed arm portion, and
        a plurality of nubs protruding from the hollowed arm portion which, when inserted into a central receptacle of the latch-receptacle, forms a mechanical latch fastener to hold the disk clamp to the spindle with the disk medium secured therebetween,
      the latch-receptacle fixed to the spindle and configured to receive and temporarily hold the latch-arm,
      a cap from which the latch-arm extends, and
      a spring positioned between the cap and a top surface of the disk clamp;
  removing, by the automated robotic machine, the disk clamp from the hub of the spindle by applying a counterforce to the disk clamp; and
  removing, by the automated robotic machine, the disk medium from the spindle.

13. The method of claim 12, wherein the clamping employs the disk clamp comprising:
  a vacuum mechanism comprising one or more through-holes positioned around the outer perimeter of the disk clamp and extending from the top of the disk clamp through to the bottom of the disk clamp and configured for receiving vacuum pressure from an external vacuum source and applying the pressure to where the disk clamp mates with a surface of the disk medium.

* * * * *